March 17, 1925.                                                              1,530,043
                              M. R. GEORGE
                        PNEUMATIC CUSHION FOR VEHICLES
                    Filed April 16, 1924        2 Sheets-Sheet 1
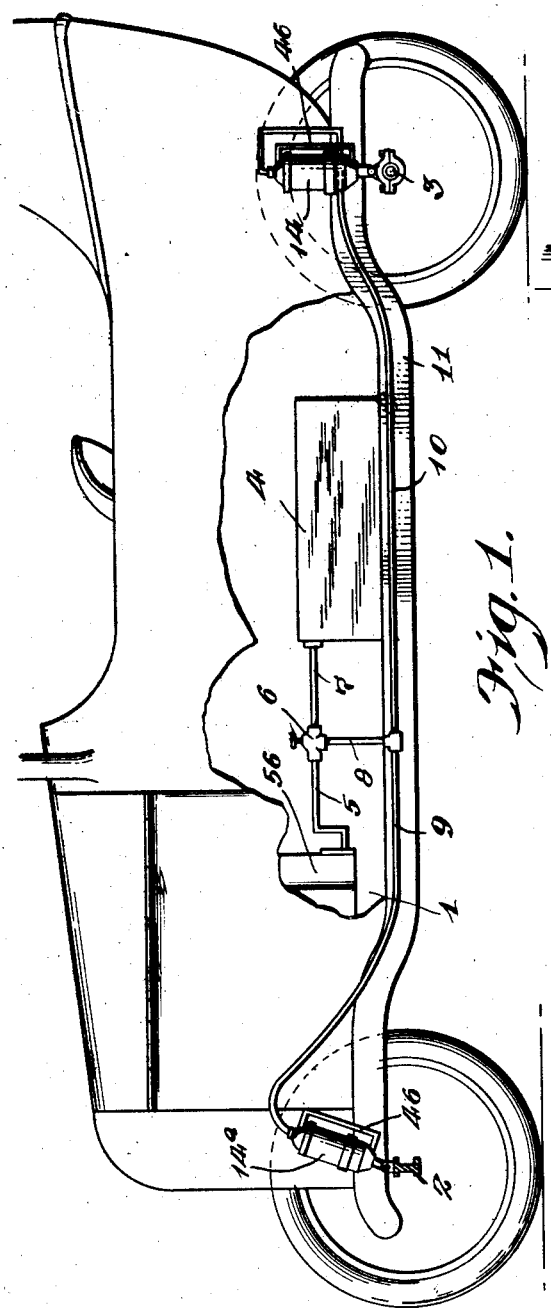
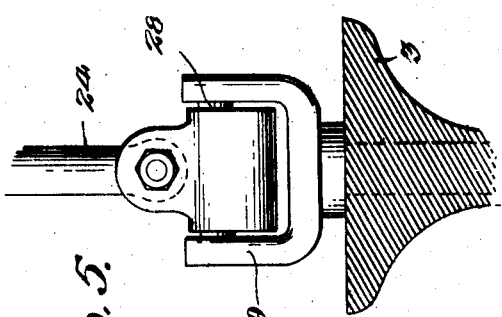
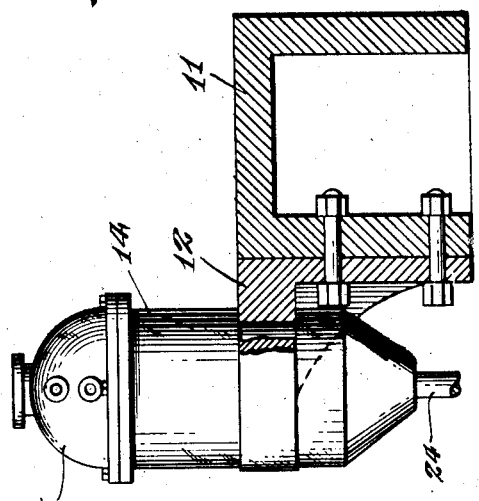
WITNESSES
INVENTOR
Marion R. George,
BY
ATTORNEYS

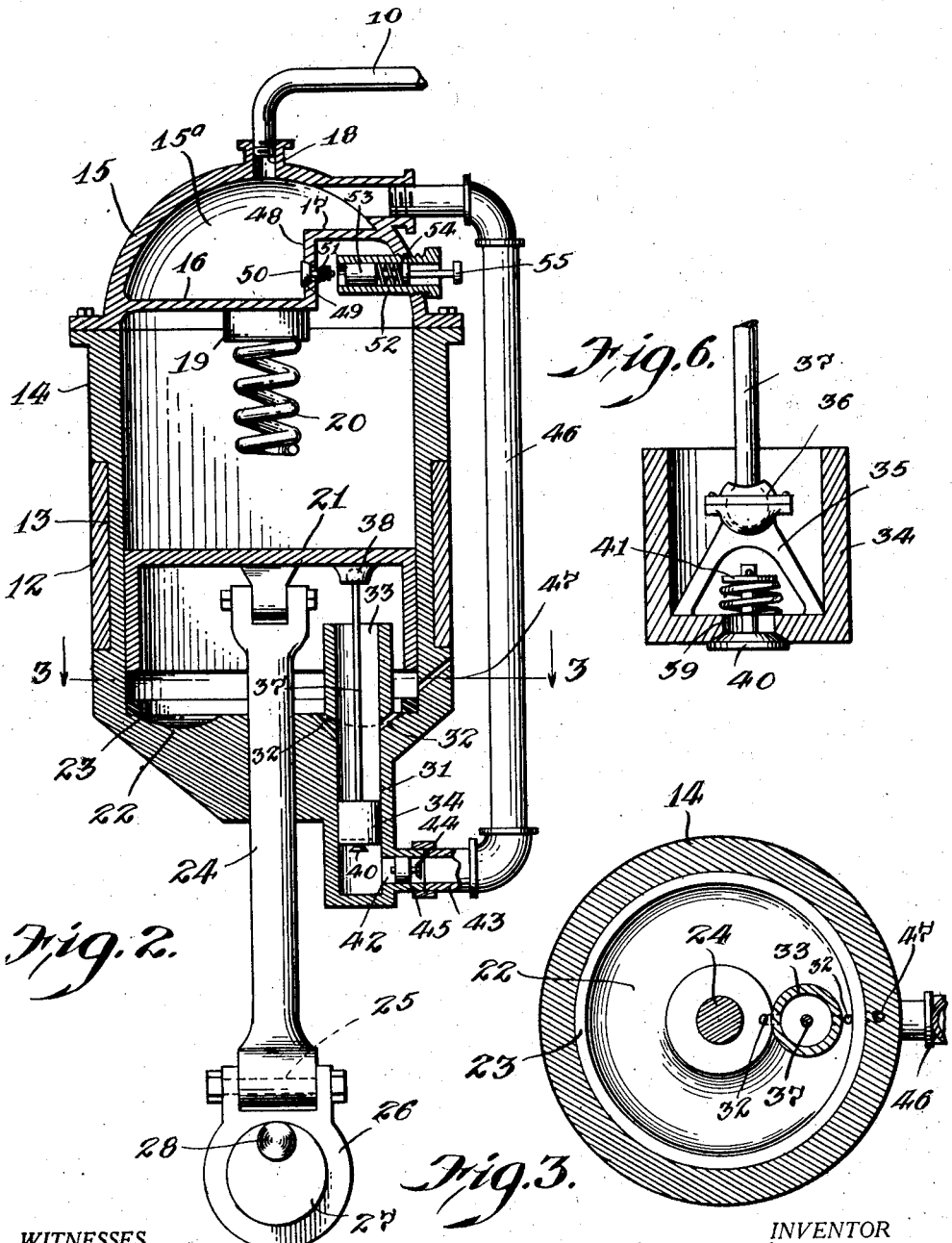

Patented Mar. 17, 1925.

1,530,043

UNITED STATES PATENT OFFICE.

MARION ROSCOE GEORGE, OF KANSAS CITY, MISSOURI.

PNEUMATIC CUSHION FOR VEHICLES.

Application filed April 16, 1924. Serial No. 706,945.

*To all whom it may concern:*

Be it known that I, MARION ROSCOE GEORGE, a citizen of the United States, and a resident of Kansas City, in the county of Jackson and State of Missouri, have invented certain new and useful Improvements in Pneumatic Cushions for Vehicles, of which the following is a specification.

This invention relates to automobiles and more especially to a pneumatic cushion support between the body of the automobile or vehicle and the running gear.

An object of the invention is the provision of a device for not only neutralizing or overcoming the recoil or rebound due to road-shocks but to provide a pneumatic support for the body.

A further object of the invention is the provision of a pneumatic support for a body in which the support is so constructed as to aid in supplying the compressed air for operating at other times the pneumatic cushion or support.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a side view of an automobile showing my invention applied thereto.

Figure 2 is a vertical section of my pneumatic cushioning device.

Figure 3 is a horizontal section of the device taken along the line 3—3 of Figure 2.

Figure 4 is a fragmentary view of the cushioning device showing the manner of connecting the same to the frame of the chassis.

Figure 5 is a fragmentary end view showing the manner of connecting the operating piston of the cushioning device to an axle.

Figure 6 is a fragmentary vertical sectional view of an auxiliary piston operated by the movement of the main piston.

Referring more particularly to the drawings, 1 designates generally an automobile having front and rear axles respectively numbered 2 and 3. The automobile carries a storage tank 4 for compressed air which is supplied through a pipe 5 with compressed air from an air compressor which is operated by the automobile engine. A two-way valve 6 is connected between pipe 5 and pipe 7 for controlling the flow of compressed air from the air compressor to the storage tank 4 and the discharge of compressed air through the pipe 8 to the pneumatic support to be presently described. The pipe 8 is connected to two branches 9 and 10 which are extended in opposite direction towards the front and the rear of the car.

To either the front or rear end of the channel beam 11 of the frame of the chassis is secured an annular bracket 12 in any approved manner as by bolts or rivets. The annular portion of the bracket is adapted to be received within a groove 13 formed in the outer wall of a cylinder 14.

The upper end of the cylinder 14 is closed by a semi-spherical hollow head 15. A partition 16 formed integrally with the head 15 is adapted to isolate chamber 15ª from the cylinder 14. The partition is provided with an annular offset portion 17 for a purpose which will be presently described. It will be seen that the air conduit 10 enters the head 15 at 18 above the partition 16. A socket 19 is formed upon the inner face of the partition 16 to receive one end of a coil spring 20. The outer free end of the coil spring is adapted to abut the piston 21 mounted for reciprocation in the cylinder 14 and support the parts when the compressed air has been completely released from the cylinder or when certain connections have been broken, permitting leakage of the air.

The lower end of the cylinder is provided with an annular groove 22 adapted to receive oil which has worked its way down from the top of said cylinder past the piston and a rubber bumper 23 mounted on a shoulder at the bottom of the cylinder and at the outer periphery of the groove 22 engages the lower end of the piston 21.

A piston rod 24 connected at its upper end to the piston 21 is slidable through a passage in the lower end of the cylinder and has its lower end pivotally connected with a bolt 25 mounted in an annular bracket 26. Revolubly mounted in the bracket is a pin 27 having longitudinally and eccentrically disposed trunnions 28 adapted to be received in a pair of spaced perforated ears 29 mounted on the axle 3 of the vehicle. The ears 29 are normally adapted to support the ends of the vehicle springs.

Cast integrally with the bottom of the cylinder 14 and having one end projecting in said cylinder and the opposite end located externally of said cylinder is a second cylinder 31 adapted to be in open communication with the groove 22 by the passages 32. The upper open end 33 of cylinder 31 is adapted to project into the lower hollow end of piston 21. A piston 34 is mounted for reciprocation in the cylinder 31 and has a web-shaped conically constructed bracket 35 projecting from the inner bottom wall of the piston, and is adapted to receive at 36 the lower end of a rod 37. The connection 36 is of the universal type. A similar connection, shown at 38, connects the rod 37 with the inner wall of the piston 21 so that pistons 21 and 34 are reciprocated simultaneously. The lower end of the piston 34 is provided with a port 39 closed normally by a valve 40. A spring 41 is adapted to maintain the valve normally seated. The lower end of the cylinder 31 is provided with a port 42.

A conduit 43 is connected with the cylinder 31 and is in communication with said cylinder with the port 42. A valve 44 mounted upon a seat 45 is adapted to act as a check valve and prevent the return of the fluid under pressure from the chamber 15ª since the conduit 46 places the conduit 43 in open communication with said chamber.

The cylinder 14 is provided with a passage 47 adapted to place said cylinder below the piston 21 in open communication with the atmosphere.

The end 48 of the offset portion 17 is provided with a port 49 connecting the chamber 15ª with the cylinder 14. A valve 50 is adapted to normally close said port and cut off such communication. A spring 51 is adapted to maintain the valve closed.

A cylinder 52 is threaded through a perforation in the cylinder head 15 adjacent the offset portion 17 and carries a plunger 53 which is moved outwardly by the air pressure in the cylinder 14 and returned by a spring 54. A set screw 55 having its inner end in engagement with the spring 54 is adapted to vary the tension of said spring on the piston 53.

Referring more particularly to Figure 1, it will be seen that the cylinder 14ª is disposed at an acute angle to the horizontal and inclined rearwardly, while the rear cylinders 14 are maintained vertical.

The operation of my device is as follows:

The pipe 5 is connected to an air compressor 56 which is operated by the engine when desired for maintaining the storage tank supplied with sufficient compressed air for operating a pneumatic system which provides an air cushion. The valve 6 being a two-way valve can either place the pipe 7 in communication with the compressor for filling the storage tank 4 or the valve may be operated to admit compressed air from the storage tank through pipe 8 to pipes 9 and 10 for supplying the pairs of cylinders 14ª at the front of the automobile and the cylinders 14 at the rear of the automobile with compressed air. Air is admitted through either pipe 9 or 10 to the respective chamber in the cylinder head 15 and when no pressure exists in the cylinder 14 the spring 54 will move the piston 53 inwardly and force valve 50 from its seat in the partition 48 to admit compressed air from said chamber to cylinder 14. When the pressure in the cylinder becomes sufficiently great to overcome the tension of the spring 54 the piston 53 is moved outwardly thereby permitting the valve 50 to close. At such a time the air pressure in the cylinder 14 is sufficient to force the piston 21 at the bottom of said cylinder.

When the axles of the automobile are elevated, due to road shocks, the compressed air in the cylinder 14 acting on the piston 21 will resist the upward movement of the piston and increase the pressure on the air in said cylinder so that the increased pressure of the air is sufficient to instantly return the piston and thus place the body in normal position relative to the running gear. Valve 50 and spring 51 are so constructed that only extreme pressure of the air in cylinder 14 will cause opening of valve 50. Piston 34 connected to piston 21 is raised with said piston and at each stroke of piston 34 air from passage 47 and oil from the groove 22 which has leaked past the piston 21 will be forced under pressure through pipe 46 to chamber 15ª. The oil will drain back past the valve 50 whenever said valve is open and the air under pressure will also be forced past said valve when the valve is open due to the low degree of pressure in the cylinder 14.

The pin 27 which connects the piston rod 24 to the axle has an eccentric movement and this is employed for the reason that when one wheel of the automobile is not acted upon by compression in the roadbed and remains at a certain horizontal level the other end of the axle will move through a relative arc of a circle when the other wheel drops into a depression in the roadbed or travels over an obstruction so that the one wheel maintains its horizontal position, while the other wheel, due to the irregularity of the roadbed, is either raised or lowered. The eccentric connection of the pin permits the axle to have oscillating movement relative to the cylinder 14 and the connecting rod 24 of the pneumatic cushion.

What I claim is:

1. A pneumatic cushion for vehicles adapted to support a body on the axles of the vehicle, comprising a cylinder adapted to be connected to the vehicle body and provided with a chamber at its upper end, a storage tank for compressed air in communication with the chamber, a valve for controlling communication between said chamber and the cylinder, means automatically operated by the air pressure in the cylinder for causing opening of the valve to admit air to the cylinder from the chamber, a piston in the cylinder, a rod connecting the piston with the vehicle axle.

2. A pneumatic cushion for vehicles adapted to support a body on the axles of the vehicle, comprising a cylinder adapted to be connected to the vehicle body and provided with a chamber at its upper end, a storage tank for compressed air in communication with the chamber, a valve for controlling communication between said chamber and the cylinder, means automatically operated by the air pressure in the cylinder for causing opening of the valve to admit air to the cylinder from the chamber, a piston in the cylinder, a rod connecting the piston with the vehicle axle, a second cylinder within the first mentioned cylinder, a piston in the second cylinder and operatively connected with the first mentioned piston to supply air under pressure to the chamber, and means for placing the second cylinder in communication with the chamber.

3. A pneumatic cushion for vehicles adapted to support a body on the axles of the vehicle, comprising a cylinder adapted to be connected to the vehicle body and provided with a chamber at its upper end, a storage tank for compressed air in communication with the chamber, a valve for controlling communication between said chamber and the cylinder, means automatically operated by the air pressure in the cylinder for causing opening of the valve to admit air to the cylinder from the chamber, a piston in the cylinder, a rod connecting the piston with the vehicle axle, a second cylinder, a piston in the second cylinder and operatively connected with the first mentioned piston, and a conduit connecting the second cylinder with the air chamber whereby upon operation of the second mentioned piston the chamber is supplied with compressed air.

4. A pneumatic cushion for vehicles adapted to support a body on the axles of the vehicle, comprising a cylinder adapted to be connected to the vehicle body and provided with a chamber at its upper end, a storage tank for compressed air in communication with the chamber, a valve for controlling communication between said chamber and the cylinder, means automatically operated by the air pressure in the cylinder for causing opening of the valve to admit air to the cylinder from the chamber, a piston in the cylinder, a rod connecting the piston with the vehicle axle, a second cylinder within the first mentioned cylinder, a piston in the second cylinder and operatively connected with the first mentioned piston to supply air under pressure to the chamber, and means for placing the second cylinder in communication with the chamber, said first mentioned cylinder being provided with lubricating oil, the cylinders being in open communication to permit oil from the first cylinder to drain to the second cylinder, the oil drained into the second cylinder being forced back to the first cylinder by the operation of the second piston.

5. A pneumatic cushion for vehicles adapted to support a body on the axles of the vehicle, comprising a cylinder adapted to be connected to the vehicle body and provided with a chamber at its upper end, a storage tank for compressed air in communication with the chamber, a valve for controlling communication between said chamber and the cylinder, means automatically operated by the air pressure in the cylinder for causing opening of the valve to admit air to the cylinder from the chamber, a piston in the cylinder, a rod connecting the piston with the vehicle axle and means associated with and actuated by the piston for forcing air under pressure to the chamber.

6. A pneumatic cushion for vehicles adapted to support a body on the axles of the vehicle, comprising a cylinder adapted to be connected to the vehicle body and provided with a chamber at its upper end, a storage tank for compressed air in communication with the chamber, a valve for controlling communication between said chamber and the cylinder, means automatically operated by the air pressure in the cylinder for causing opening of the valve to admit air to the cylinder from the chamber, a piston in the cylinder, a rod connecting the piston with the vehicle axle, said cylinder being adapted to store a predetermined quantity of lubricating oil, a pump having a cylinder in communication with the atmosphere and the first mentioned cylinder for forcing lubricant and air under pressure to the chamber.

7. A pneumatic cushion for vehicles adapted to support a body on the axles of the vehicle, comprising a cylinder adapted to be connected to the vehicle body and provided with a chamber at its upper end, a storage tank for compressed air in communication with the chamber, a valve for controlling communication between said chamber and the cylinder, a plunger for operating said valve to open position, a spring for causing the effective working stroke of the piston, the air pressure in the cylinder being adapted to overcome the action of the spring for operating the plunger to permit closing of the valve, a piston in the cylinder, a rod connecting the piston with the vehicle axle.

MARION ROSCOE GEORGE.